Figure 1:
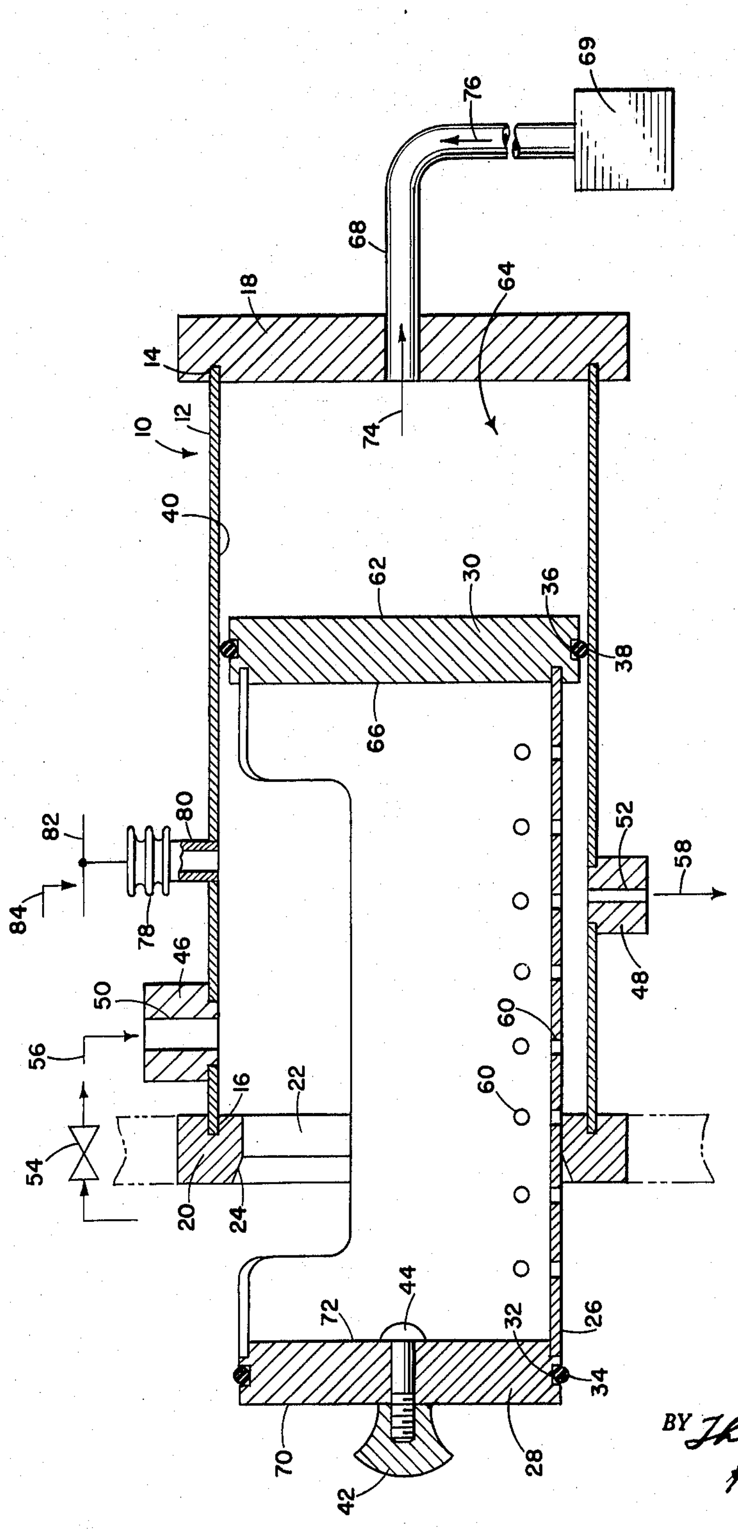

April 19, 1966 R. D. CASTLE 3,246,947

METHOD AND APPARATUS FOR PRESSURIZING A CHAMBER

Filed March 1, 1962

INVENTOR.
RICHARD D. CASTLE

BY Thomas, Roesel & Schorr

ATTORNEYS 3,246,947

METHOD AND APPARATUS FOR PRESSURIZING A CHAMBER

Richard D. Castle, Rochester, N.Y., assignor to Wilmot Castle Company, Rochester, N.Y., a corporation of New York Filed Mar. 1, 1962, Ser. No. 176,517
8 Claims. (Cl. 21—56)

This invention relates to method and apparatus for pressurizing a chamber with a compressible fluid and particularly to method and apparatus for pressurizing a sterilizing chamber with steam.

Heretofore, known sterilizers provided a steam pressurizable chamber which was open to the atmosphere only during a preliminary introduction of steam therein for downward displacement of the air in the sterilizer. After preliminary downward displacement of air in the chamber, the chamber was sealed to the atmosphere and the chamber pressurized by steam introduced therein until a selected sterilizing temperature and pressure was reached. This selected sterilizing temperature and pressure was maintained during a selected sterilization period after which the chamber was open to atmospheric pressure to reduce the steam temperature and pressure of the chamber or reduced air pressure was utilized to more rapidly reduce the pressure and temperature in the chamber subsequent to sterilization.

This invention contemplates method and apparatus for pressurizing the steam sterilizing chamber and completing sterilization of the articles to be sterilized therein while maintaining the chamber open to atmospheric pressure.

The preferred embodiment of this invention includes an outlet from the sterilization chamber which is of a selected size smaller than the steam inlet for the chamber, thereby permitting the steam pressure in the chamber to be elevated to a selected value within a desired period of time.

This invention is particularly useful in sterilization of medical instruments or other articles requiring only sterilization of the exterior surfaces thereof.

It is a significant object of this invention to provide improved method and apparatus for pressurizing a chamber with a compressible fluid and fulfilling sterilization of articles to be sterilized.

It is a further object of this invention to provide improved method and apparatus for pressurizing a steam sterilization chamber.

It is also an object of this invention to pressurize a sterilizing chamber while exposed to atmosphere.

It is another object of this invention to provide greatly simplified method and apparatus for pressurizing a steam chamber.

It is an additional object of this invention to provide considerably less expensive sterilization apparatus for manufacture and maintenance.

It is a further object of my invention to provide the method for continuously introducing steam at a faster rate than it is being exhausted until a temperature sufficiently above the selected sterilizing temperature is reached to fulfill sterilization of articles contained in the vessel before reduction of temperature and pressure in the chamber to a sufficient safe value to permit removal of the articles from the sterilizing vessel.

Other objects and advantages of this invention will particularly be set forth in the claims and will be apparent from the following description, when taken in connection with the accompanying drawings, in which:

FIG. 1 is a side elevational view in section of one embodiment of my invention.

With reference to FIG. 1, a vessel generally indicated by the numeral 10 defines a pressurizable chamber comprising a cylindrical shell or main body portion 12, opposite ends of which are rigidly mounted in annular grooves 14 and 16 of a vertically disposed backplate 18 and a vertically disposed front plate 20, respectively.

Front plate 20 has a circular opening 22, including an outwardly tapered portion 24. Opening 22 slidably supports a substantially cylindrically shaped tray or basket 26. A door or closure member 28 and a locking plate 30 are rigidly mounted at opposite ends of tray 26, which serves to connect plates 28 and 30 in spaced relationship.

It will be understood that in the preferred embodiment of the invention illustrated in FIG. 1, that the locking plate 30 is larger in diameter than the closure plate 28.

Plate 28 is provided with an annular peripheral groove 32 receiving an O-ring seal 34 adapted for sealing the closure plate 28 within annular opening 22. The locking plate 30 is likewise provided with a peripheral groove 36 receiving an annular O-ring seal 38 for slidably sealing plate 30 to the inside periphery 40 of the cylindrical shell 12.

Closure plate 28 is provided with a handle 42, rigidly mounted thereon by a bolt 44, for manual control of the tray 26. Tray 26 is preferably adapted to receive medical or dental instruments for sterilization within the sterilizing vessel 10.

Shell 12 is provided with an inlet fitting 46 and an outlet fitting 48. An inlet hole or bore 50 of fitting 46 is larger in diameter than a corresponding outlet hole or opening 52 of fitting 48 for the purpose hereinafter described. Steam is introduced through a valve 54 from a source of steam under pressure. Steam is diagrammatically indicated by the arrow 56 entering fitting 46 and being discharged through fitting 48 as indicated by the arrow 58.

A plurality of perforations 60 are provided in the tray 26 for diffusion of the steam after passing through the articles (not shown) to be sterilized therein, thereby facilitating the discharge of steam out the bottom of tray 26 through outlet opening 52 and preventing any substantial accumulation of condensation in the bottom of the tray.

It will be understood that as the tray 26 and attached plates 28 and 30 are moved from an open position, such as illustrated in FIG. 1, to a closed position in which the closure plate 28 and opening 22 are in vertical or radial alignment, the seal 38 slidably seals an outside surface 62 of locking plate 30 from the internal steam pressure of the shell 12. When the closure plate 28 is in the closed position with the opening 22, the right hand portion of the shell 12 surrounding locking plate 30 must be concentric therewith in order to maintain sealed relationship between locking plate 30 and shell 12. A portion of shell 12 generally indicated by the numeral 64 is of varying volumetric area depending upon the position of locking plate 30 relative to back plate 18. Portion 64 of the sterilizer shell 12 communicates through a conduit 68 with either atmosphere or a pressure reducing system 69. Portion 64 must be vented in order for the air therein to escape as the tray 26 is moved from the open position to the closed position and for air to return to portion 64 upon opening of the tray 26.

From the above description, it will be understood that after the tray 26 has been filled with the dental, medical or other instruments or articles to be sterilized therein and moved to the closed position above described, the steam will be introduced into the shell 12 through valve 54 and inlet opening 50.

It is significant that the inlet 46 is provided intermediate plates 28 and 30 when in the closed position. The force or total pressure on the outside surface 62 of locking plate 30 is, at least, no greater than the force or total pressure on an outside surface 70 of the closure plate 28 in the opposite direction. The total steam pressure exerted on the inside surface 66 of the larger diameter locking plate 30 is sufficient to overcome the total pressure exerted on an inside surface 72 of the smaller diameter closure plate 28 and exert a force on the locking plate 30 in a direction to the right as viewed in FIG. 1, thereby to maintain tray 26 and attached plates 28 and 30 in the closed and sealed position.

Increased and decreased pressure from a pressure control system 69 controls the movement of the tray 26 between the open and closed positions respectively. In this regard, the locking plate 30 serves as a piston.

After the instruments have been received in the tray 26, a manually operated treadle (not shown), controlling the pressure system 69, is actuated to effect a withdrawal of air from portion 64 in the direction indicated by an arrow 74, thereby to move the sealed locking plate 30 to the right until the closed position is reached. Thereafter, the vacuum produced by the pressure system 69 may be maintained to increase the total pressure on the locking plate 30 in a direction to the right as viewed in FIG. 1 or it may be discontinued.

After sterilization has been completed in the vessel 10, the flow of air from the pressure system 69 may be reversed to introduce increased air pressure, indicated by the arrow 76, thereby to move the tray 26 to the left, as viewed in FIG. 1, to the open position again.

The differential size of the inlet and outlet openings 50 and 52 permits the steam being introduced through inlet opening 50 to flow into the vessel 10 at a faster rate than it is expelled through the smaller diameter opening 52. Thus, steam pressure builds up inside the vessel despite continued exhaust. The illustrated embodiment of FIG. 1 shows a diameter ratio of 3:1. It will be understood that this ratio could be varied to meet specified conditions. Bactericidal action is effected by building up the steam pressure to a peak well above the necessary sterilizing pressure, as for example, to a peak of 60 pounds per square inch (p.s.i.) and thereafter cutting off the steam supply. In order to build up a chamber pressure of, for example, 60 p.s.i., a line pressure of at least 70 p.s.i. is preferable for a construction where the inlet opening is ⅜ inch diameter and the outlet opening is ⅛ inch diameter; such a construction contemplates a sterilizing cycle lasting between 40 and 60 seconds. The relative size of the inlet and outlet openings depend on the line pressure of the steam and the size of the vessel. Each of these factors can be varied to give the desired cycle starting at zero pressure and preferably going to 60 p.s.i. chamber pressure and dropping back down to zero pressure.

In order to automatically accomplish the above described cycle, a pressure or temperature responsive device such as a pressure sensitive bellows 78 is provided in open communication with the inside of vessel 10 through a conduit 80. Bellows 78 carries a contact switch 82 which makes and breaks a circuit, including a contact 84, which closes valve 54 when the chamber pressure reaches a seselected value such as 60 p.s.i. After the valve 54 is closed, the chamber pressure drops from the selected peak value of 60 p.s.i. to atmospheric pressure. Thus, apparatus is provided whereby the sterilizing chamber defined by the shell 12 is always open to atmospheric pressure with an outlet of selected size sufficiently small enough to permit pressurization of the sterilizing chamber up to a selected peak value, at which value the valve 54 is automatically closed to cut off steam pressure to the chamber, and the chamber pressure then drops down to atmospheric pressure.

Thus, a complete cycle has been described and after the internal pressure of the vessel 10 has reached atmospheric pressure the operator may manually open the tray 26 by pulling handle 42 to the left as viewed in FIG. 1 if the sealed portion 64 of the shell 12 is vented to atmosphere, or in the alternative, depress the treadle (not shown) for operating the fluid pressure system 69 to introduce air pressure indicated by the arrow 76 into the sealed portion 64 and automatically move the tray 26 to the left.

While there has been shown and described the preferred form of mechanism of this invention it will be apparent that various modifications and changes may be made therein, particularly in the form and relation of parts, without departing from the spirit of this invention as set forth in the appended claims.

I claim:

1. In a steam sterilizer construction,
(a) a vessel defining a pressurizable chamber,
(b) means including a steam inlet introducing steam under pressure into said chamber, and
(c) means smaller than said steam inlet exhausting steam from said chamber at a selected slower rate than steam is being introduced therein by said steam introducing means to raise the temperature and pressure in said chamber to a selected value.

2. In a steam sterilizer construction,
(a) a vessel defining a pressurizable chamber,
(b) means including an inlet for introducing steam under pressure into said chamber,
(c) means including an outlet exhausting steam from said chamber at a selected slower rate than steam is being introduced therein by said steam introducing means to raise the temperature and pressure in said chamber to a selected value; and
(d) control means responsive to the selected values for stopping said steam introducing means without interrupting the exhaust means, thereby permitting the temperature and pressure in said chamber to reduce to safe values for the removal of goods to be sterilized therein.

3. In a steam sterilizer construction,
(a) a vessel defining a pressurizable chamber,
(b) steam inlet means of selected size extending from a source of steam under pressure to said chamber,
(c) steam outlet means extending from said chamber to atmosphere,
(d) said outlet being of a selected size sufficiently smaller than said steam inlet thereby to permit the temperature and pressure in said chamber to reach a preselected elevated sterilizing value during simultaneous introduction into and exhaust of steam from said chamber.

4. A method of sterilizing articles in a chamber,
(a) introducing steam under pressure into a chamber,
(b) exhausting steam from said chamber while being introduced therein at a selected slower rate than steam is being introduced into said chamber, thereby to bring the temperature and pressure in said chamber up to at least a selected sterilizing value,
(c) reducing the temperature and pressure in said chamber to safe values after a selected sterilizing period to permit removal of said articles from the chamber.

5. A method of sterilizing articles in a chamber,
(a) introducing steam under pressure into a chamber,
(b) exhausting steam from said chamber while being introduced therein at a selected slower rate than steam is being introduced into said chamber, thereby to bring the temperature and pressure in said chamber up to at least a selected sterilizing value,
(c) discontinuing the introduction of steam into said chamber after the temperature and pressure in said chamber have been maintained at least at said selected sterilizing value for a selected sterilizing period while continuing to exhaust steam, thereby to reduce the temperature and pressure in said chamber to safe values for removal of said articles.

6. A method of sterilizing articles in a chamber,
(a) introducing steam under pressure into a chamber,
(b) substantially continuously exhausting steam from said chamber while being introduced therein at a selected slower rate than steam is being introduced into said chamber, thereby to bring the temperature and pressure in said chamber up to a selected value above a selected sterilizing value, (c) reducing the temperature and pressure in said chamber to safe values for removal of said articles from the chamber after a selected sterilizing period.

7. A method of sterilizing articles in a chamber, (a) introducing steam under pressure into a chamber, (b) substantially continuously exhausting steam from said chamber while being introduced therein at a selected slower rate than steam is being introduced into said chamber, until the temperature and pressure in said chamber are elevated to a selected value above a selected sterilizing temperature, (c) discontinuing the introduction of steam into said chamber after the temperature and pressure in said chamber have reached said selected value above sterilizing temperature while continuing to exhaust steam, thereby to reduce the temperature and pressure in said chamber to safe values after sterilization for removal of said articles.

8. A method of sterilizing articles in a chamber, (a) introducing steam under pressure into a chamber, (b) substantially continuously exhausting steam from said chamber while being introduced therein at a selected slower rate than steam is being introduced into said chamber until the temperature and pressure in said chamber are elevated to a selected value above a selected sterilizing temperature, (c) discontinuing the introduction of steam into said chamber after the temperature and pressure in said chamber have reached said selected value above sterilizing temperature while continuing to exhaust steam, thereby to reduce the temperature and pressure in said chamber to safe values for removal of said articles, (d) said selected value above a selected sterilizing temperature being sufficient to fully sterilize said articles before the temperature and pressure in said chamber drop below said selected sterilizing temperature after discontinuing the introduction of steam.

References Cited by the Examiner

UNITED STATES PATENTS

| | | | |
|---|---|---|---|
| 903,853 | 11/1908 | Gartner | 21—98 XR |
| 3,088,180 | 5/1963 | Lauterbach | 21—56 XR |
| 3,147,068 | 9/1964 | Castle et al. | 21—98 |

MORRIS O. WOLK, *Primary Examiner.*